March 15, 1955  J. J. STRACKER  2,703,908
HEAT DEFLECTOR FOR POT HANDLE
Filed May 12, 1954
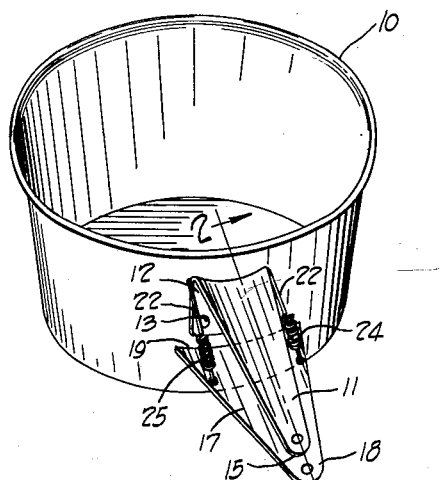
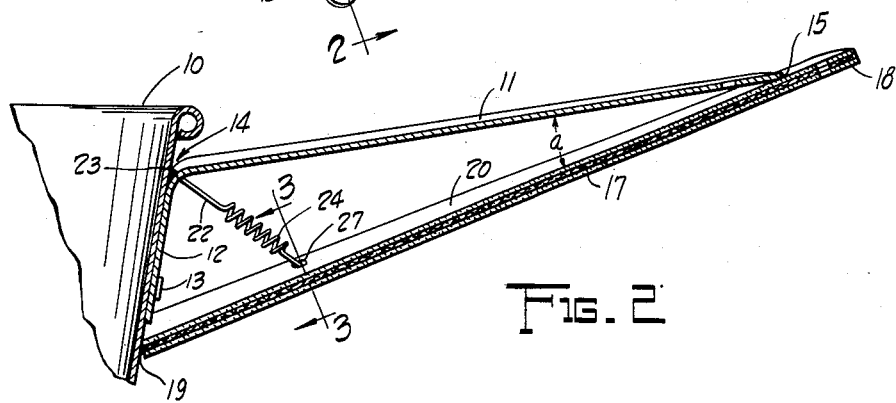
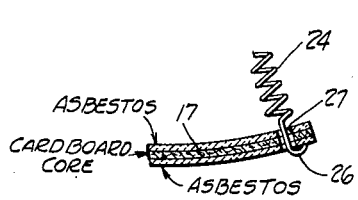
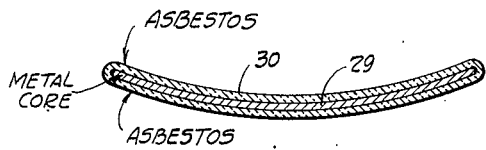
INVENTOR.
JOSEPH J. STRACKER
BY
Bosworth Sessions Herrstrom
& Williams
ATTORNEYS

United States Patent Office 2,703,908
Patented Mar. 15, 1955

2,703,908

HEAT DEFLECTOR FOR POT HANDLE

Joseph J. Stracker, Avon Lake, Ohio

Application May 12, 1954, Serial No. 429,174

2 Claims. (Cl. 16—116)

This invention has to do with a heat deflecting shield for use beneath the handle of a kitchen utensil as, for example, a saucepan or the like.

In the past, handle protectors have been available for application to and use beneath the lower end of the handle of a coffee pot, this for the purpose of preventing the flames, products of combustion or hot air, as the case may be, from reaching and damaging the material of which the handle is made. In other instances, slip-on handle protectors have been provided which, in a general way, have been intended to take the place of fabric pot holders, these protectors as a rule taking the form of non-metallic sleeves capable of being slipped on and off the handle of a skillet or the like. Such previously known handle protectors as those described above have usually been confined to a handle of one particular shape requiring one particular form of protector and, at least as far as presently known, have not been adaptable for use interchangeably on a variety of utensils of different sizes and shapes.

The present invention has for its principal object to provide a separable shield that can be readily applied to the handle of a kitchen utensil, that can be removed from it without difficulty, and that can be made to accommodate itself to kitchen utensils of differing diameters. To the latter end, the shield is preferably formed of a readily distortable material. As will appear below, a material having a capacity for ready distortion by the fingers has especial advantages, this in that it can be made to accommodate itself to kitchen utensils of more than one diameter. Preferably, the material is a heat-insulating laminate which in one form may consist of a stiff non-metallic core covered on both sides by asbestos paper and in another may be characterized by a metal core covered by asbestos or a similar insulating material.

Other objects and advantages of the invention will be apparent from the description which follows and from the accompanying drawings in which:

Figure 1 is a perspective showing a saucepan of conventional construction to which is applied the heat deflecting shield of the present invention;

Figure 2 is a section on a vertical plane passing through line 2—2 of Figure 1, the section being on a scale considerably larger than that of Figure 1;

Figure 3 is a fragmentary section on a plane on line 3—3 of Figure 2, the scale being somewhat larger than that of Figure 2; and Figure 4 is a transverse section through a modified form of shield.

As it appears from Figure 1, saucepan 10 is of conventional construction. It has a projecting metal handle 11 of which the downturned inner end or ear portion 12 is held in intimate contact with the periphery of the saucepan by brazing or, if preferred, by means of a plurality of rivets 13. Where a handle of this type is used, a long, narrow horizontally extending recess 14 is formed immediately above downturned portion 12, of which advantage can be taken for the purposes of the present invention, as hereinafter explained. The handle is ordinarily tapered from the periphery of the saucepan to its outer end 15, where it is usually rounded off more or less as shown.

Making contact with the rounded outer end 15 of handle 11 is a heat deflecting shield 17 the extreme outer end 18 of which preferably projects outward beyond handle 11. Shield 17 is generally similar in shape to handle 11; that is to say, it tapers from the saucepan towards its end 18, or differently stated, flares from end 18 thereof toward the zone in which it makes contact with the side walls of the saucepan. In the zone in which it is to make such contact, it is cut away as shown at 19 (Figure 1) along an arc which conforms more or less closely to the shape of the saucepan. If desired, shield 17 may be flat but preferably it is formed with a trough 20 (Figure 2) the depth of which increases progressively from end 18 to cut away portion 19. Thus the shield has a convex lower surface for deflecting heat upwardly and outwardly; at the same time, because it is trough-shaped, it has a concave upper surface.

Shield 17 is best made of readily deformable material, so that the depth of trough 20 may, if desired, be increased somewhat with a view to using the shield on a saucepan of lesser diameter or decreased somewhat with a view to using it on a saucepan of greater diameter. Given a trough of appropriate depth, cut away portion 19 will conform itself exactly or almost exactly to the periphery of saucepans of several sizes. If, for example, the trough of the shield is made shallower than in Fig. 2, so that it approaches a plane, cut away portion 19 will accommodate itself to a saucepan of greater diameter; if, on the other hand, the trough is increased in depth, cut away portion 19 will accommodate itself to a saucepan of smaller diameter. Variation in the size of angle $a$ (Figure 2) will of course result, but this is of no importance for the reason that shield 17 serves the purpose of deflecting heat whether it is closer to or farther removed from handle 11 than is the case in Figure 2.

It is of course necessary to provide means for holding handle 11 and shield 17 in the desired relationship to each other; that is to say, spaced sufficiently from each other so that the fingers can grasp handle 11 in the usual way. To this end, suitable retaining means 22 for coupling handle 11 to shield 17 are provided: preferably, such retaining means are resilient so that shield 17 can seek and find a suitable position in relation to handle 11, which is rigidly fixed to the saucepan. According to the preferred embodiment of the invention, such retaining means are looped over handle 11 and fastened to shield 17, although they might, if desired, be looped over shield 17 and fastened to handle 11. In the form of the invention shown, the retaining means are of metal, made of wire, and provided with a horizontally extending portion 23 (Figure 2) which fits into the previously mentioned recess 14 just above downturned portion 12 of handle 11.

From Figure 1 it will be noted that retaining means 22 include two downwardly extending portions. In the latter are formed two coil springs 24 and 25, seen in Figures 1 and 2, which springs are provided to introduce the desired high degree of resilience into the retaining means. Below the springs, shield 17 is provided as shown in Figure 3 with openings 27 through which the ends of the retaining means can project for fastening purposes. As is apparent from Figure 3, coil spring 24 has at its lower end a hook-like portion 26 which bears against the under surface of shield 17 around the periphery of one of the openings 27 for receiving the lower ends of the retaining means. A similar arrangement characterizes the opposite side of the shield immediately below spring 25.

Other means for fastening retaining means 22 to shield 17 may be substituted for that shown, although the arrangement shown and described is preferable to most arrangements for the reason that it provides a simple, inexpensive balanced construction.

In applying shield 17 to handle 11, shield 17 is first moved endwise beneath handle 11 toward the position shown in Figures 1 and 2. As this is done, retaining means 22 are looped over the projecting end 15 of the handle. Cutaway portion 19 of shield 17 is then brought into proximity to the side wall of saucepan 10, after which retaining means 22 are worked lengthwise of handle 11 as far as may be necessary under the circumstances. There comes a point where retaining means 22 can be snapped into recess 14, where the horizontally extending portion 23 thereof lodges securely and remains as long as shield 17 is being used. If it is desired to remove shield 17, as for cleaning the saucepan, the horizontally extending portion 23 of retaining means 22 is withdrawn from recess 14, after which shield 17 and retaining means 22 can be removed by retracting them lengthwise along handle 11.

As previously indicated, the material of which shield 17 is made is preferably a heat-insulating laminate of the kind which may consist of a central core, conveniently cardboard, and two sheets of heavy asbestos paper, one sheet on either side of the cardboard core. However, it is equally practicable to use a metal or plastic core covered on both sides by asbestos or a similar insulating material; such a construction is illustrated in diagrammatic fashion in Figure 4. Although the heat-insulating covering is a desirable feature of the shield, it is obvious that the asbestos may be omitted and the core, particularly if of metal, may be used in uncoated condition. In such circumstances, heavy sheet tin or a similar metal that lends itself to ready deformation as above described may be used.

By using a heat deflecting shield of the kind described, the person using the saucepan is protected from the flames, products of combustion, hot air, etc., which normally move upward around the periphery of the saucepan. If, as will sometimes be the case, the handle 11 is of wood, it is protected from charring or burning, this even though an abnormally high degree of heat may be used under the saucepan. There is, however, little or no interference with the normal use of the handle, for the angular space corresponding to angle $a$ (Figure 2) is sufficiently large for the insertion of the fingers of the hand. In this connection it will be noted that the use of a potholder is not necessary.

One of the advantages of the invention resides in the fact that shield 17 is sufficiently deformable so that the depth of the trough may be changed by manipulation of the shield by the fingers. As previously explained, this has the effect of modifying the shape of the shield, permitting the shield to be used with a number of utensils of different diameters. If, for example, the shield is designed for use with a two-quart saucepan, it may be manually adapted by the pressure of the fingers to permit it to take a 1½ quart saucepan or a 2½ quart saucepan. It is self-evident that the shield is not limited in its use to a saucepan but can be used also with skillets, double boilers, etc., all of which are comprehended by the term "pan" as herein used.

The means for coupling the shield to the handle can vary widely. Thus the retaining means may take any one of a wide number of forms; for example, spring clips may be used, if desired, along the adjoining edges of the handle and the shield. Springs of different shape and manner of operation may be employed in lieu of the coil springs shown in illustrating the preferred embodiment of the invention. Numerous other variations of a like nature may be made without departing from the spirit of the invention.

It is intended that the patent shall cover, by suitable expression in the appended claims, all features of patentable novelty residing in the invention.

I claim:

1. A quick detachable heat deflector for the handle of a pan, comprising an elongated transversely and upwardly concave shield, said shield having an inner transverse edge closely engaging the periphery of the pan below the pan handle and side edges, said side edges tapering toward each other from said inner edge and converging and joining each other at the outer end of the shield remote from the inner edge, a resilient continuous band having its ends connected at laterally spaced points to said shield adjacent said side edges, respectively, said points of connection being more closely spaced to said inner shield edge than to said outer shield end, said band extending upwardly from and looping over the handle at the junction of the handle and pan and resiliently urging the outer end portion of the shield into engagement with the outer end of of the handle, the vertical spacing between said handle and said shield decreasing uniformly from a maximum at the pan to zero at the outer end of the handle.

2. A heat deflector for the handle of a pan, comprising an elongated transversely and upwardly concave shield having an inner edge and side edges, said side edges converging from maximum spacing at said inner edge and joining at the outer end of said shield, means for detachably securing said shield to said handle comprising a resilient band fastened at laterally spaced points on said shield and longitudinally spaced from the inner edge thereof, said band looping over said handle at the junction of the handle and the pan and urging said shield to pivot upwardly about said inner edge, the outer end of the handle being engageable with the outer end portion of the shield to limit said upward movement of the shield.

References Cited in the file of this patent

UNITED STATES PATENTS

| | | |
|---|---|---|
| 1,338,830 | Grob | May 4, 1920 |
| 1,487,749 | Martus | Mar. 25, 1924 |
| 1,492,251 | Kolp | Apr. 29, 1924 |
| 2,619,672 | Glaser | Dec. 2, 1952 |